(12) United States Patent
Oliver et al.

(10) Patent No.: US 7,077,226 B2
(45) Date of Patent: Jul. 18, 2006

(54) CONTROLLED TRUCK CAB SUSPENSION SYSTEM

(75) Inventors: Michael L. Oliver, Xenia, OH (US); Todd A. Bishop, Centerville, OH (US); Eric L. Jensen, Dayton, OH (US); William C. Kruckemeyer, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 255 days.

(21) Appl. No.: 10/645,684

(22) Filed: Aug. 21, 2003

(65) Prior Publication Data

US 2004/0104061 A1 Jun. 3, 2004

Related U.S. Application Data

(60) Provisional application No. 60/405,136, filed on Aug. 21, 2002, provisional application No. 60/465,132, filed on Apr. 24, 2003.

(51) Int. Cl.
*B62D 33/06* (2006.01)

(52) U.S. Cl. .............. 180/89.12; 280/5.514; 267/64.16; 290/190.01

(58) Field of Classification Search ............ 280/5.507, 280/5.514, 6.15; 180/89.12, 89.13, 89.14; 267/64.16, 64.17, 64.19, 64.26, 64.27; 296/190.6, 296/190.7, 190.01, 190.06, 190.07
See application file for complete search history.

(56) References Cited

U.S. PATENT DOCUMENTS

| 3,966,009 | A | * | 6/1976 | Meacock et al. | ........ 180/89.15 |
| 4,468,739 | A | * | 8/1984 | Woods et al. | .................. 701/37 |
| 4,871,189 | A | * | 10/1989 | Van Breemen | .......... 267/64.27 |
| 4,909,536 | A | * | 3/1990 | Hale | ....................... 280/6.157 |
| 4,934,667 | A | * | 6/1990 | Pees et al. | ................ 267/64.21 |
| 5,014,199 | A | * | 5/1991 | Konishi et al. | ................ 701/37 |
| 5,039,072 | A | * | 8/1991 | Bartholomew | ........... 267/64.24 |
| 5,109,939 | A | * | 5/1992 | Conaway et al. | ........ 180/89.15 |
| 5,299,651 | A |   | 4/1994 | Wilson |  |
| 5,649,692 | A | * | 7/1997 | Gilsdorf et al. | .......... 267/64.21 |

(Continued)

*Primary Examiner*—Paul N. Dickson
*Assistant Examiner*—Toan C. To
(74) *Attorney, Agent, or Firm*—Scott A. McBain (57) ABSTRACT

The invention is a suspension system, typically for use between a cab and a truck frame, includes a strut module having a strut and an air spring, and a control module, connected to a source of pressurized air, for sensing a distance between the cab and truck frame and selectively pressurizing the air spring in response to changes in that distance. Preferably, the strut is a McPherson-type strut and the air spring encloses at least a portion of the strut to provide a compact assembly and includes a three point connection to the cab and frame to resist relative lateral movement between the cab and frame. The strut also preferably is a magnetorheological-type damper so that the control module can adjust the damping characteristics of the strut to optimize rider comfort.

16 Claims, 8 Drawing Sheets

U.S. PATENT DOCUMENTS

| | | |
|---|---|---|
| 5,779,009 A | 7/1998 | Iwasaki |
| 6,029,764 A * | 2/2000 | Schubert .................. 180/89.13 |
| 6,070,681 A * | 6/2000 | Catanzarite et al. ..... 180/89.15 |
| 6,073,714 A * | 6/2000 | McHorse et al. ........ 180/89.14 |
| 6,181,997 B1 | 1/2001 | Badenoch et al. |
| 6,219,602 B1 | 4/2001 | Badenoch et al. |
| 6,370,458 B1 | 4/2002 | Shal et al. |
| 6,397,134 B1 | 5/2002 | Shal et al. |
| 6,398,198 B1 * | 6/2002 | Okamoto .................. 267/64.27 |
| 6,513,798 B1 * | 2/2003 | Capek et al. ............ 267/64.27 |
| 6,547,224 B1 | 4/2003 | Jensen et al. |
| 6,592,112 B1 | 7/2003 | Bishop et al. |
| 6,598,932 B1 * | 7/2003 | Gross et al. ........... 296/190.07 |
| 6,633,803 B1 | 10/2003 | Shal et al. |
| 6,726,272 B1 * | 4/2004 | Puterbaugh et al. ... 296/190.01 |
| 6,758,294 B1 * | 7/2004 | Peddycord et al. ...... 180/89.12 |

\* cited by examiner

CONTROLLED TRUCK CAB SUSPENSION SYSTEM

CROSS REFERENCE TO RELATED APPLICATIONS

The present application claims priority of U.S. Provision Application Nos. 60/405,136 filed Aug. 21, 2002, and 60/465,132 filed Apr. 24, 2003.

TECHNICAL FIELD

The present invention relates to suspension systems and, more particularly, to suspension systems for use with truck cabs and the like.

BACKGROUND OF THE INVENTION

Figure 1:
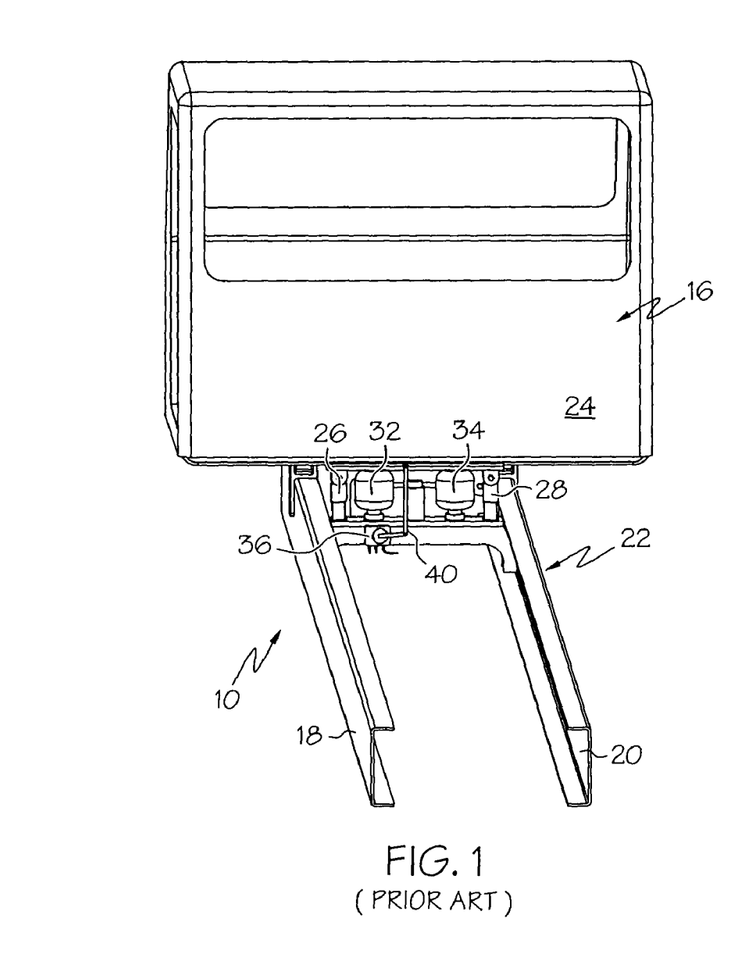
FIG. 1 is a rear perspective view of a prior art suspension system used with a cab and frame of a truck or tractor.
Figure 2:
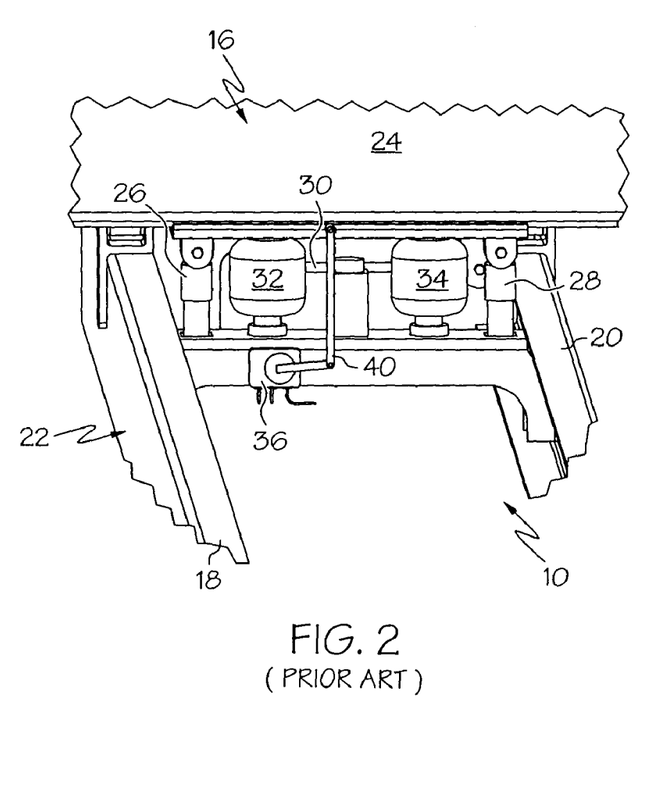
FIG. 2 is a detail showing a rear perspective view of the prior art suspension system shown in FIG. 1.
Figure 3:
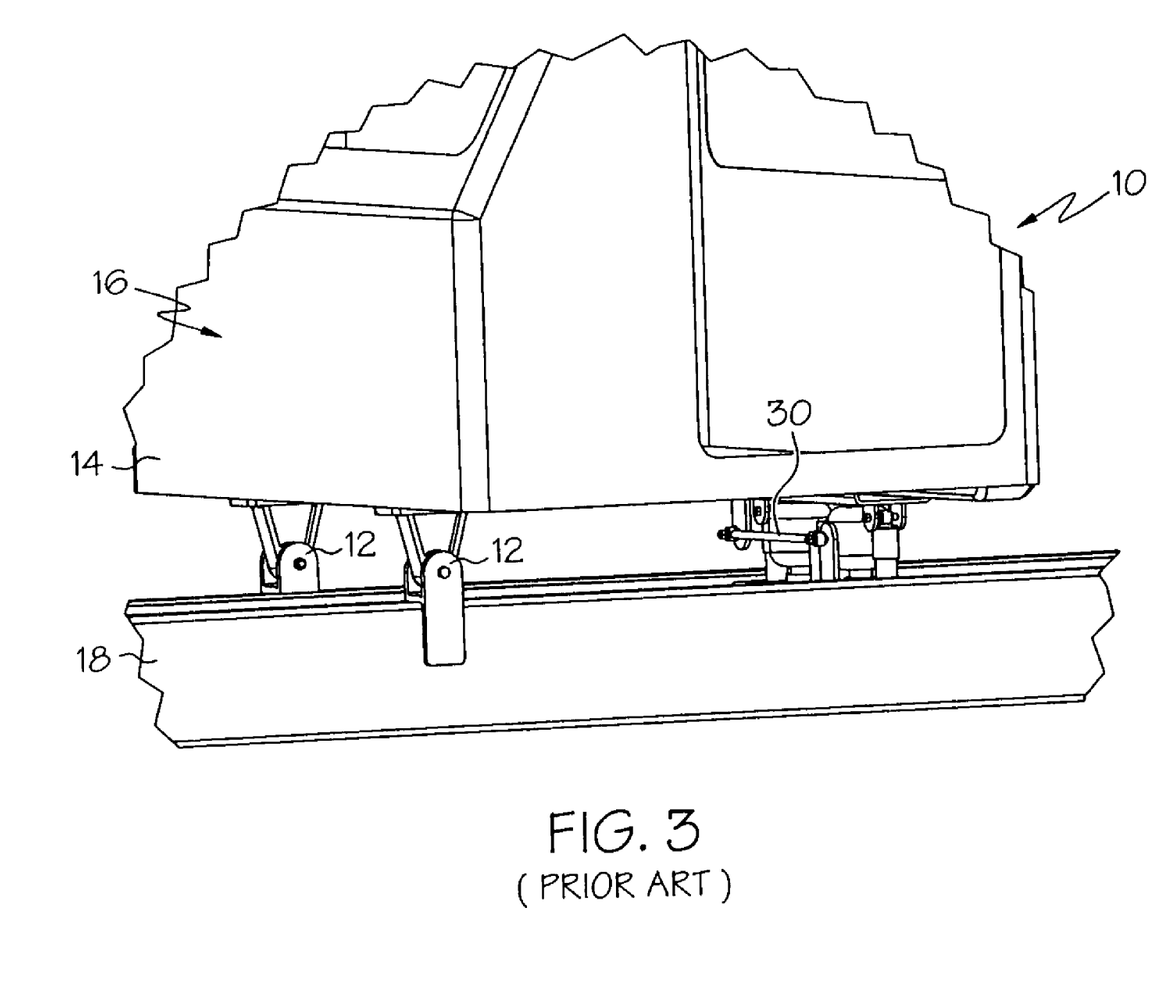
FIG. 3 is a detail showing a side perspective view of the prior art suspension system shown in FIG. 1.
Figure 4:
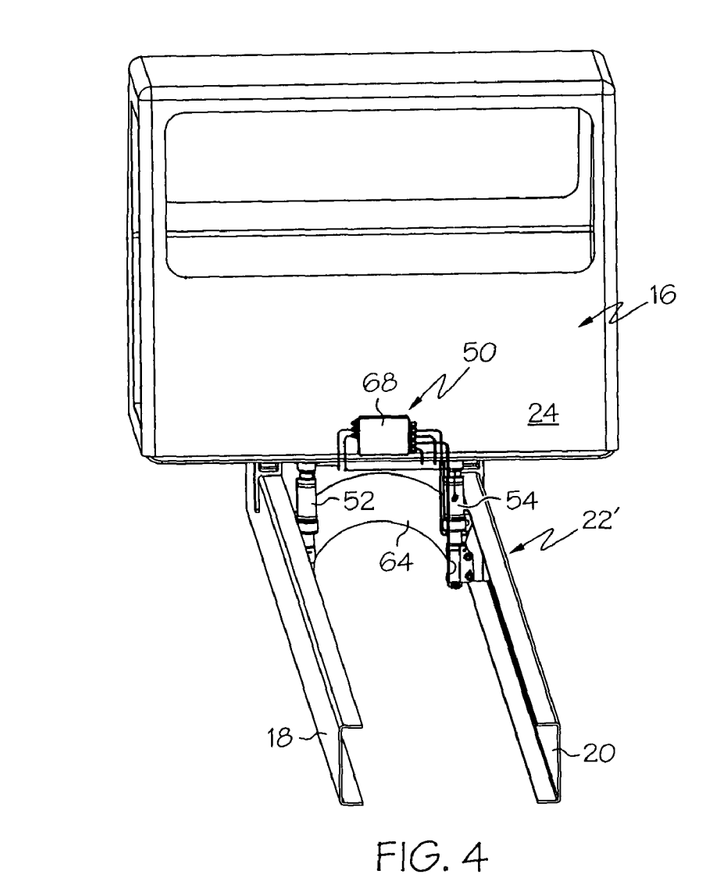
FIG. 4 is a rear perspective view of one embodiment of the suspension system of the present invention.
Figure 5:
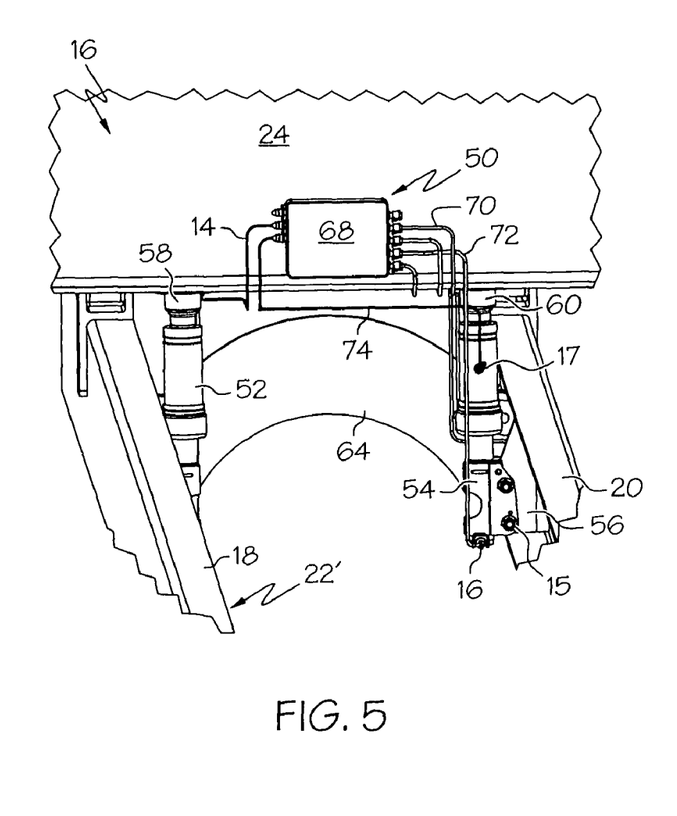
FIG. 5 is a detail showing a rear perspective view of the suspension system of FIG. 4.
Figure 6:
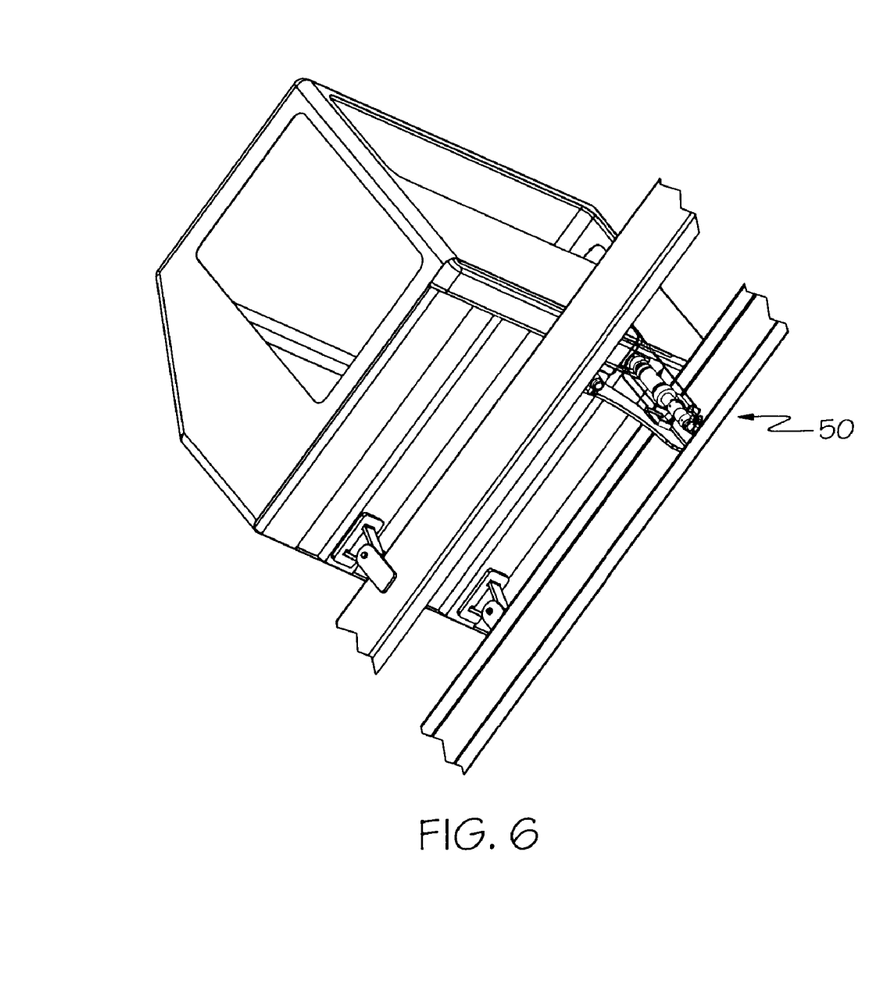
FIG. 6 is a bottom perspective view of the suspension system of FIG. 4.
Figure 7:
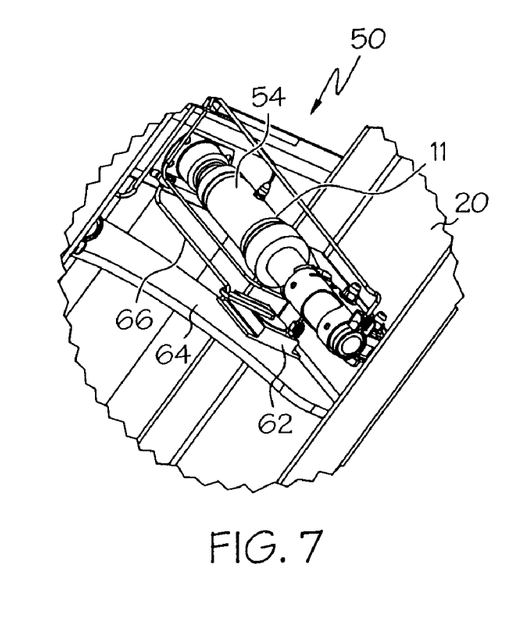
FIG. 7 is a detail showing a bottom perspective view of the suspension system of FIG. 4.
Figure 8:
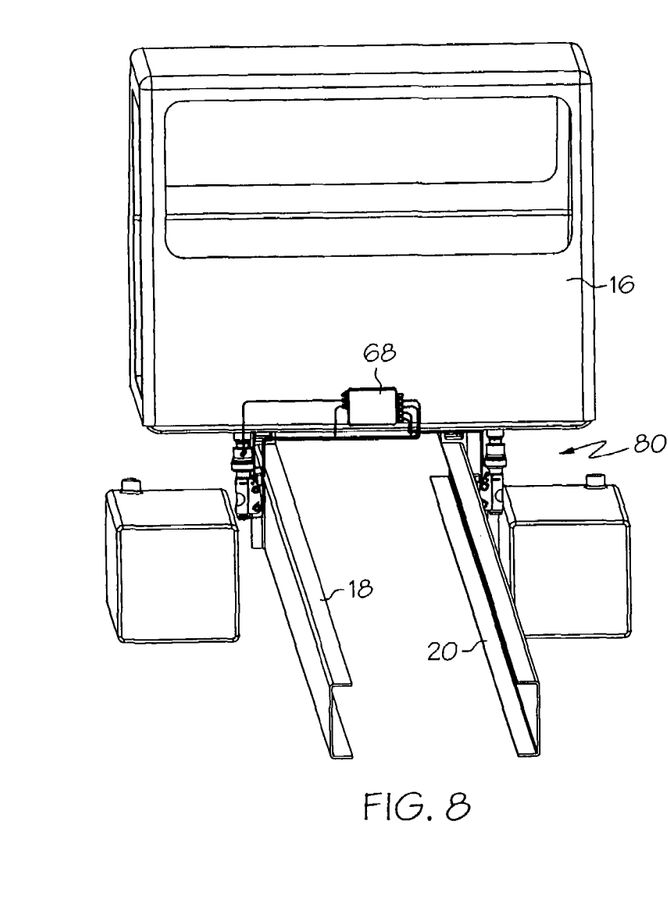
FIG. 8 is a rear perspective view of an alternate embodiment of the suspension system of the present invention.
Figure 9:
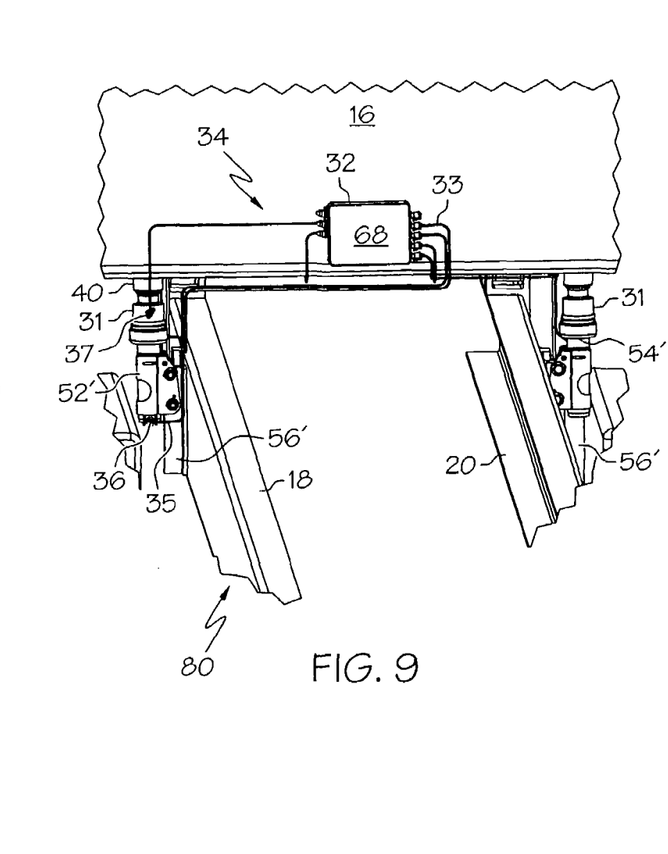
FIG. 9 is a detail showing a rear perspective view of the suspension system of FIG. 8.
Figure 10:
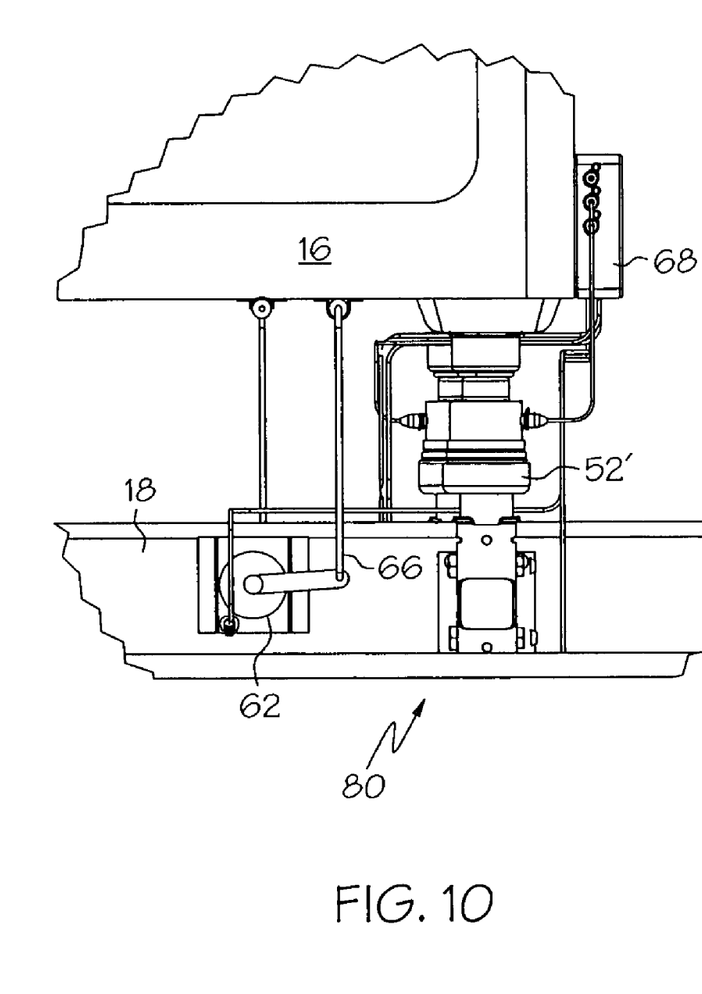
FIG. 10 is a detail showing a side elevation of the suspension system of FIG. 8.

Medium and heavy-duty trucks and tractors frequently utilize a suspension system installed between the truck frame and the driver's cab to absorb shock and dampen vibrations, thereby enhancing driver comfort. As shown in FIGS. 1, 2 and 3, a prior art cab suspension system, generally designated 10, includes bushings 12 that pivotally attach the front 14 of a cab 16 to frame elements 18, 20 of an associated frame 22. The bushings 12 provide flexible attachment while controlling fore and aft movement of cab 16 relative to the frame 22. The rear 24 of the cab is attached by a system including one or more shock absorbers 26, 28, a panhard rod 30, one or more air springs 32, 34, and an air control valve 36.

The shock absorbers 26, 28 dampen vertical motion between the cab 16 and frame 22 while a transverse link or panhard rod 30 resists lateral motion. The air springs 32, 34 support the rear 24 of the cab 16. The air control valve 36 is mounted on a transverse support 38, includes a linkage 40 connected to cab rear 24, and is responsive to changes in the vertical distance between the frame 22 and cab rear. The air control valve 36 is connected to a source (not shown) of pressurized air and to the air springs 32, 34 and adjusts the air pressure in the air springs for changing cab loads.

A disadvantage with such prior art systems is that they are overly complex, relatively expensive and occupy a relatively large amount of space beneath the cab and between the rails of the associated truck or tractor. Accordingly, there is a need for a truck cab suspension system that minimizes the components required and increases the clearance beneath the cab and between the tractor frame rails, while providing lateral support and shock-damping functions. There is also a need for a truck cab suspension system whose shock and vibration damping characteristics can be varied to optimize rider comfort.

SUMMARY

The present invention is a controlled suspension system particularly adapted to provide a rear mount for a truck or tractor cab on an associated vehicle frame. The suspension system preferably includes a strut having an air sleeve and adapted to be attached at one end to a truck cab and at an opposite end to an associated truck frame, a height sensor adapted to be attached to the cab and frame for measuring a distance therebetween and generating a signal indicative thereof, and a controller for receiving the signal from the height sensor and selectively pressurizing the strut air sleeve. The controller can be programmed to pressurize the air sleeve of the strut to maintain a predetermined distance, or range of distances, between the cab and frame. The strut dampens vibrations and impact shocks to provide a smooth ride to the occupants of the cab.

The strut includes an inner tube, an outer tube concentric with the inner tube and a bearing sleeve positioned between the inner and outer tubes. The bearing sleeve distributes a bending moment applied to the ends of the strut from relative motion between the cab and the frame. The strut preferably is a magnetorheological ("MR") damper and the controller is programmed to vary the damping characteristics according to a predetermined parameters.

The strut preferably includes a three-point connection to the cab and frame to resist relative lateral movement between the cab and frame. Two of the three points of connection may be with the cab, or in the alternative, with the frame. Accordingly, the present invention eliminates the need of a panhard rod.

An advantage of the suspension system of the present invention over prior art systems, such as those described above, is that shock-absorbing and spring functions of the suspension system are combined into a single, compact component that can be positioned below the cab and to the side to provide clearance for other components of the truck or tractor. In a preferred embodiment, the system includes a pair of struts, each positioned adjacent to a frame element, thereby providing clearance in the area beneath the center of the cab for optional power takeoff equipment and the like. The pair of struts can be positioned either inboard or outboard of the frame elements. As a result of the controllable spring and damping characteristics of the suspension system of the present invention, the invention provides increased driver comfort while providing a more compact and lightweight construction.

Other objects and advantages of the present invention will become apparent from the following description, the accompanying drawings and the appended claims.

DETAILED DESCRIPTION OF THE INVENTION

One embodiment of the present invention, generally designated 50, is shown in FIGS. 4, 5, 6 and 7. Struts 52, 54, preferably McPherson-type struts, are mounted noncompliantly (i.e., rigidly) to the insides of frame rails 18, 20, preferably to flanges 56 (only one of which is shown) attached to the rails. Resilient mounts 58, 60 attach the struts 52, 54 to the rear 24 of the cab 16. The resilient mounts 58, 60 may be of any design that allows for angular compliance (i.e. pivotal movement of the struts 52, 54 relative to the cab 16) while restricting lateral and vertical compliance.

At least one height sensor 62 is mounted on a transverse member 64 extending between rails 18, 20 and is attached by a link 66 to the cab 16 to measure the height of the cab above the frame rails. The height sensor 62 is of conventional design and alternately may be mounted on the cab 16 and have a link to the member 64.

A controller 68 of conventional design is connected by electrical conduit 70 to receive a signal from the height sensor 62 and is connected electronically by conduit 72 to magnetorheological (MR) dampers in the struts 52, 54 and by a pneumatic conduit 74 to air springs on the struts (the details of which are set forth below with respect to FIGS. 11–14). Electrical and pneumatic supply connections to the controller 68 from sources of electrical power and pressurized air on the associated vehicle are not shown. The controller 68 receives data from the height sensor 62, computes desired damping requirements and air spring pressure and adjusts the damping and air spring pressure in the struts 52, 54 to optimize driver comfort. Although the foregoing discussion and associated drawing figures are directed to strut 54, it is to be understood that the pneumatic and electrical connections from controller 68 to strut 52 are identical.

Another embodiment of the present invention, generally designated 80, is shown in FIGS. 8, 9, 10 and 11. In this embodiment 80, struts 52', 54' are mounted on the outsides of the frame rails 18, 20, preferably to flanges 56'. A height sensor 62 is mounted on the outside of rail 18 and includes a link 66 attached to the cab 16. As with the embodiment 50 of FIGS. 4–7, the struts 52', 54' are actuated by a controller 68 that selectively pressurizes air springs integral with the struts and selectively adjusts the damping of the struts of optimize the ride characteristics experienced by occupants of the cab 16.

Figure 11:
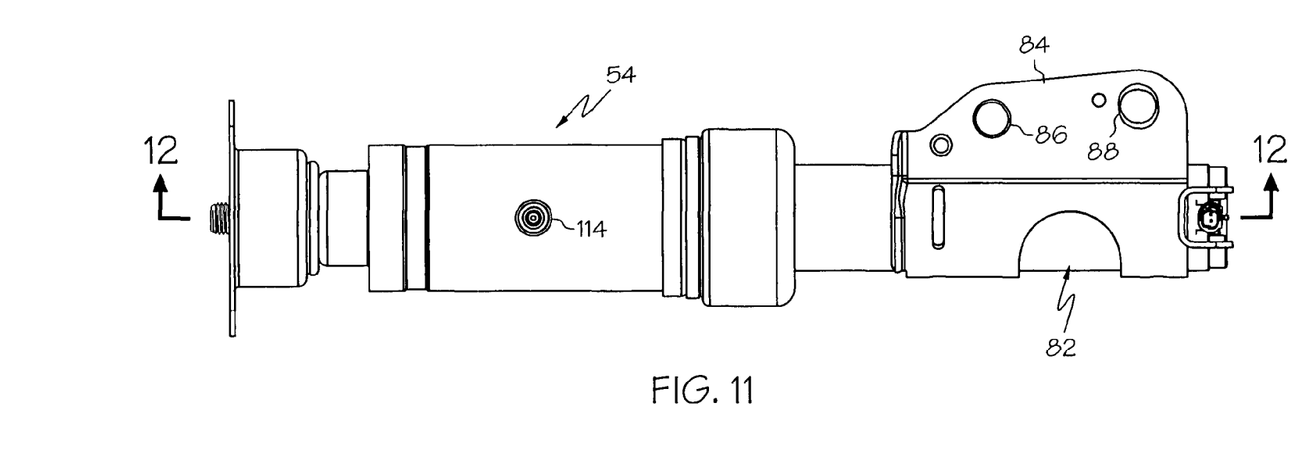
FIG. 11 is a side elevation of a strut of the suspension system of the present invention.

The structure of the struts 52, 54, 52', 54' generally is the same as the MR strut described in U.S. Pat. No. 6,345,706, the disclosure of which is incorporated herein by reference, with added features to accommodate an air spring. As shown in FIG. 11, the strut 54 includes a lower end 82 having a wing 84 with two holes 86, 88 to receive bolts (not shown) to attach the strut to the flange 56 (see FIG. 5). This two-point connection prevents relative lateral movement between the cab and frame.

Figure 12:
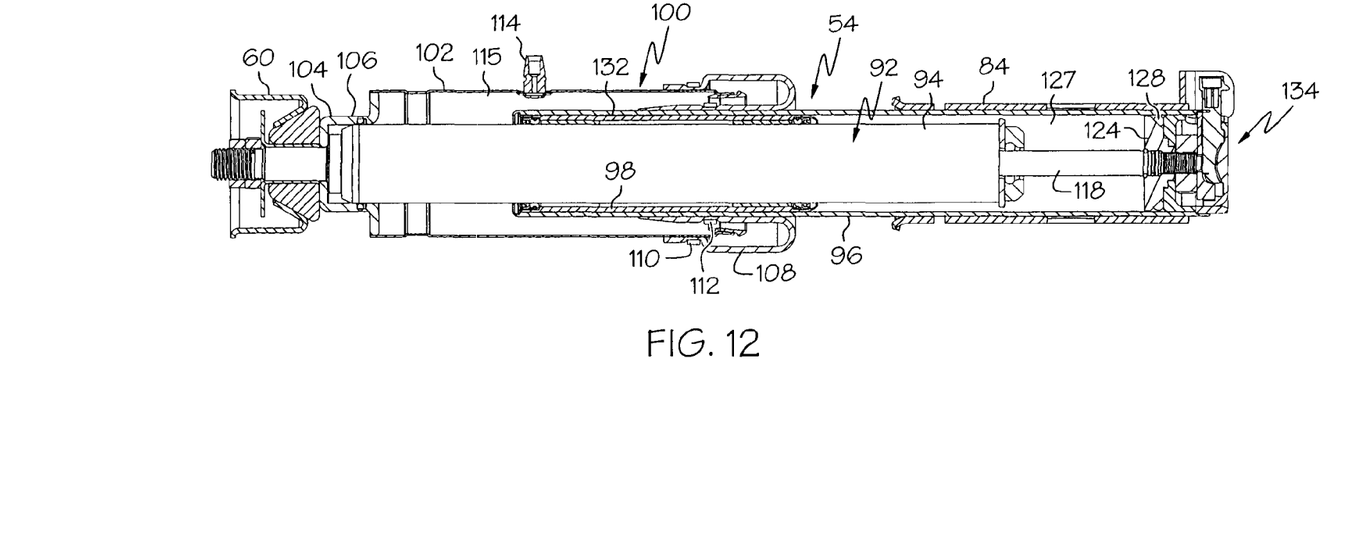
FIG. 12 is a side elevation in section of the strut of FIG. 11.

As shown in FIG. 12, the strut 54 includes an MR strut element 92 having an inner tube 94, an outer tube 96 and a bearing sleeve 98 that facilitates relative movement between the inner tube and outer tube. The bearing sleeve 98 distributes bending moments applied to the ends of the strut 54 along the lengths of the inner and outer tubes 94, 96, respectively. Resilient mount 60 is attached to the inner tube 94.

Strut 54 includes an air integral spring 100 that is concentric with the MR strut element 92. The air spring 100 includes an outer, rigid, tubular housing 102 terminating in an end plate 104 having a seal 106 that fits against the inner tube 94 of the MR strut element 92. The housing 102 is connected to a flexible sleeve 108 by a ring 110. The sleeve 108 is curved radially inwardly on itself and is sealed to the outer tube 96 by ring 112. An air fitting 114 is mounted on the tubular housing 102 and is connected to air conduit 74 (see FIG. 5). Consequently, an air chamber 115 is formed by housing 102, end plate 104, sleeve 108 and inner and outer tubes 94, 96, respectively that may be selectively pressurized by controller 68 (see FIG. 5) to vary the effective spring constant of the air spring 100, thereby affecting the ride characteristics of the systems 50, 80.

Figure 13:
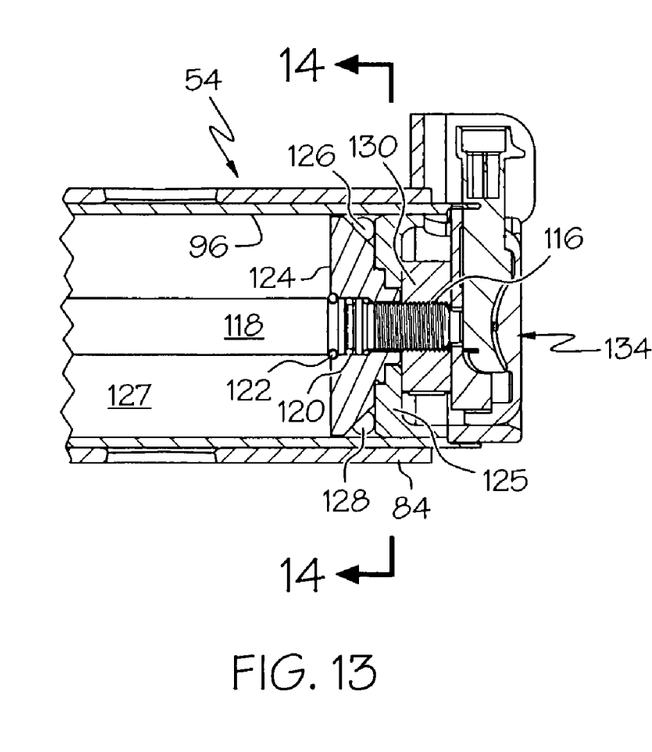
FIG. 13 is a detail side elevation in section of the strut of FIG. 11.
Figure 14:
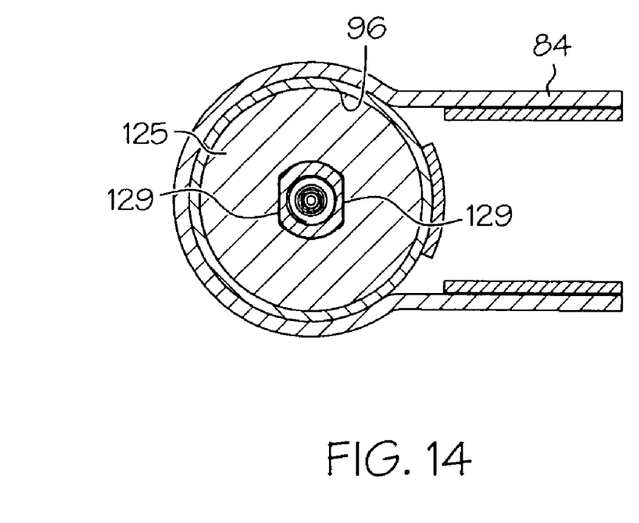
FIG. 14 is section taken at line 14—14 of FIG. 13.

An additional air seal may be required at the bottom of the strut 54, best shown in FIGS. 13 and 14. A threaded end 116 of an inner rod 118 has grooves to accept a seal element 120 (e.g., an O-ring) and a retaining ring 122. A seal adapter 124 is shaped to nest within a strut base 125 and includes a central hole 126 that is threaded at an outer end, a sealing surface in the mid-portion and a seat for the retaining ring 122 at the inner end. The seal adapter 124 is installed on the end of the inner rod 118, forming a seal with seal element 120 and seating against the retaining ring 122. The retaining ring 122 may be a section of round spring wire formed into a partial ring.

The outer surface of the seal adapter 124 is shaped to fit inside the body of the outer tube 96 and retain a seal element 128 (e.g., an O-ring) against the outer tube. As a result, the seal adapter 124 and seal elements 120, 128 form a sealed chamber 127 with outer tube 96, inner tube 94 and bearing sleeve 98.

As best shown in FIG. 14, the seal adapter 124 includes an antirotation projection (flat 129) that mates with a corresponding feature when it is installed in the strut base 125. This is to enable a nut 130 to be tightened without rotating inner rod 118 to retain the end of the inner rod in the body of the inner tube 96. Additionally, it may be necessary to provide an air flow groove (not shown) at location 132 (see FIG. 12) to form a pneumatic connection between the chamber of the air spring and the chamber near the end of the inner rod 118. The strut 54 also includes an electrical connector assembly 134 (see FIG. 13), located outside of the strut base 125 and seal adapter 124, for connecting the MR strut element 92 to the controller 68 (see FIG. 5). As a result of the seal formed by seal adapter 124 and related components 120, 128, there is no need to make either strut base 125 or connector assembly 134 airtight.

While the forms of apparatus herein described constitute preferred embodiments of the invention, it is to be understood the invention is not limited these precise forms of apparatus, and that changes may be made therein without departing from the scope of the invention.

What is claimed is:

1. A controlled suspension system for use between a truck cab and an associated truck frame comprising:
   (a) a strut adapted to be attached at one end to said cab and at an opposite end to said frame, said strut including an air sleeve capable of being selectively pressurized, an inner tube, an outer tube concentric with said inner tube, and a bearing sleeve positioned between said inner tube and said outer tube, whereby said bearing sleeve distributes a bending moment applied to the ends of said strut;
   (b) a height sensor adapted to be attached to said cab and said frame for measuring a distance therebetween and generating a signal indicative thereof; and
   (c) a controller for receiving said signal from said height sensor and selectively pressurizing said strut;

(d) whereby said distance between said cab and said frame is maintained within desired limits by selective pressurization of said strut.

2. The suspension system of claim 1 wherein said air sleeve is connected to said inner tube and said outer tube.

3. The suspension system of claim 2 wherein said air sleeve is concentric with said inner tube.

4. The suspension system of claim 3 wherein said air sleeve includes a flexible portion connected to said outer tube.

5. The suspension system of claim 4 wherein said air sleeve includes a relatively rigid portion connected to said inner tube.

6. The suspension system of claim 5 wherein said relatively rigid portion is concentric with said inner tube.

7. The suspension system of claim 1 wherein said strut includes a three-point connection adapted to interconnect said cab and said frame, whereby said three-point connection resists relative lateral movement between said cab and said frame.

8. The suspension system of claim 1 wherein said frame includes a pair of longitudinal frame elements and said strut is adapted to be positioned adjacent to one of said frame elements, thereby providing clearance beneath said cab and between said frame elements.

9. The suspension system of claim 8 wherein said strut is adapted to be positioned adjacent an inboard side of one of said frame elements.

10. The suspension system of claim 9 wherein said strut is adapted to be mounted on said one of said frame elements.

11. The suspension system of claim 8 wherein said strut is adapted to be positioned adjacent an outboard side of said one of said frame elements.

12. The suspension system of claim 1 wherein said frame includes a pair of longitudinal frame elements; said strut is adapted to be positioned adjacent one of said frame elements, and further comprising a second strut, said second strut being adapted to be positioned adjacent the other one of said frame elements; thereby providing clearance beneath said cab and between said frame elements.

13. The suspension system of claim 12 wherein said strut and said second strut are adapted to be positioned adjacent inboard sides of said frame elements.

14. The suspension system of claim 12 wherein said strut and said second strut are adapted to be positioned adjacent outboard sides of said frame elements.

15. The suspension system of claim 12 wherein said second strut includes an air sleeve capable of being selectively pressurized; said controller being connected to selectively pressurize said second strut.

16. A controlled suspension system for use between a truck cab and an associated truck frame comprising:
   (a) a strut adapted to be attached at one end to said cab and at an opposite end to said frame, said strut including an air sleeve capable of being selectively pressurized, an inner tube, an outer tube concentric with said inner tube, wherein said air sleeve is concentric with said inner tube and includes a relatively rigid portion connected to said inner tube and a flexible portion connected to said outer tube, and said air sleeve, said inner tube and said outer tube define a primary air chamber, and said strut includes a seal adapter that, together with said inner tube and said outer tube, defines a secondary air chamber, and a bearing sleeve positioned between said inner tube and said outer tube, whereby said bearing sleeve distributes a bending moment applied to the ends of said strut;
   (b) a height sensor adapted to be attached to said cab and said frame for measuring a distance therebetween and generating a signal indicative thereof; and
   (c) a controller for receiving said signal from said height sensor and selectively pressurizing said strut;
   (d) whereby said distance between said cab and said frame is maintained within desired limits by selective pressurization of said strut.

* * * * *